United States Patent [19]

Reighter

[11] 4,130,536

[45] Dec. 19, 1978

[54] HIGH HUMIDITY RESISTANT ELECTRICAL GRADE POLYMER CONCRETE

[75] Inventor: David H. Reighter, Roslyn, Pa.

[73] Assignee: Gould Inc., Rolling Meadows, Ill.

[21] Appl. No.: 841,724

[22] Filed: Oct. 13, 1977

[51] Int. Cl.$^2$ ............................................. C08L 63/00
[52] U.S. Cl. .............................. 260/37 EP; 252/63.2; 252/63.5
[58] Field of Search .................. 260/37 EP; 252/63.5, 252/63.2; 106/97

[56] References Cited

U.S. PATENT DOCUMENTS

| | | | |
|---|---|---|---|
| 3,198,758 | 8/1965 | Donnelly | 260/37 EP X |
| 3,258,477 | 6/1966 | Plueddemann et al. | 106/97 X |
| 3,277,052 | 10/1966 | Thompson et al. | 260/37 EP X |
| 3,297,089 | 1/1967 | Spain | 260/37 EP X |
| 3,328,339 | 6/1967 | Tierney | 260/37 EP |
| 3,510,443 | 5/1970 | Vandenberg et al. | 260/37 EP |
| 3,532,653 | 10/1970 | Smeal | 260/37 EP X |
| 3,647,742 | 3/1972 | Stevens | 260/37 EP |

FOREIGN PATENT DOCUMENTS

| | | | |
|---|---|---|---|
| 2416149 | 10/1974 | Fed. Rep. of Germany | 260/37 EP |
| 280294 | 1/1971 | U.S.S.R. | 260/37 EP |

*Primary Examiner*—Lewis T. Jacobs
*Attorney, Agent, or Firm*—Ostrolenk, Faber, Gerb & Soffen

[57] ABSTRACT

Moisture absorption by polymer concrete under high humidity conditions is greatly reduced by treating the concrete aggregate with a silane.

10 Claims, No Drawings

HIGH HUMIDITY RESISTANT ELECTRICAL GRADE POLYMER CONCRETE

BACKGROUND OF THE INVENTION

Since about 1952, there has been sporadic interest in the use of cement concrete as an electrical insulator and recently this interest has quickened primarily because of economic pressures brought about by the rise in cost of conventional porcelain and epoxy insulators.

Concrete is a mixture of an aggregate and a binder which can be cement or a polymer, or both. A major problem in the use of concrete as an electrical insulator is the difficulty in constructing an insulator which has sufficient resistance to high humidity. Moisture is the single most deleterious component which affects the properties of a polymer containing concrete and even what seems to be an insignificant amount of residual moisture, i.e., about 0.2% or less, can adversely effect the electrical properties.

Recently, great strides have been made in the construction of a polymer concrete having appropriate electrical properties for use as an insulator. However, it has been found that such new materials are still plagued by the problem of water absorption with the passage of time under high humidity conditions such as those encountered on the Gulf Coast of the United States.

Accordingly, it is the object of this invention to provide a polymer containing electrical insulation grade concrete in which moisture absorption under high humidity conditions with the passage of time is greatly reduced. This and other objects of the invention will become apparent to those skilled in the art from the following detailed description.

SUMMARY OF THE INVENTION

This invention relates to an improved polymer containing electrical insulation grade concrete for indoor and outdoor use on electrical power systems. The cement is prepared from silane treated aggregate, binder and, optionally, cement.

DESCRIPTION OF THE INVENTION

The electrical insulation grade concrete of the present invention is a mixture of silane treated aggregate and a binder, the latter being a polymer or a mixture of polymer and cement.

The aggregate employed is that normally used in preparing concrete and is thus a conglomeration of broken stone, gravel, pebbles, glass-furnace slag or cinders, ceramics, sand and the like. Crushed electrical grade porcelain forms an excellent aggregate. The conglomeration of materials forming the aggregate should have a variety of particle sizes to reduce the amount of volume which will be filled by the binder portion of the concrete.

The silane used to treat an aggregate is preferably of the formula $R'Si(OR)_3$ in which R is alkyl or alkoxyalkyl, preferably containing 1 to 8 carbon atoms, and in which R' is an organo functional group such as amino, mercapto, epoxy, or methacryloxy and preferably bonded to the silicon atom by a lower alkyl (1–4 carbon atom) chain. Thus, suitable silanes include vinyltriethoxysilane, vinyl-pris (2-methoxyethoxy) silane, $\gamma$-methacryloxypropyltrimethoxysilane, $\gamma$-aminopropyltrimethoxysilane, N-$\beta$-(aminoethyl)-$\gamma$-aminopropyltrimethoxysilane, $\beta$-(3,4-epoxycyclohexyl) ethyltrimethoxysilane, $\gamma$-glycidoxypropyltrimethoxysilane, $\gamma$-mercaptopropyltrimethoxysilane, and the like.

The aggregate can be treated with the silane in any suitable fashion such as by mixing in a suitable tumbling device, spraying the silane on the aggregate, or the like. In general, the silane is employed in an amount of about 0.05–2.0 weight percent based on the weight of the aggregate and preferably about 0.1–1.0%. For convenience of handling, the silane can be diluted with any suitable inert compatible carrier such as a mixture of water and isopropyl alcohol. In such cases, however, the treated aggregate should be dried to eliminate the carrier. The contacting is effected at preferably ambient temperature and pressure and for a length of time to permit effective contact between the silane and the aggregate, generally 0.1–5 hours and preferably 0.1–0.5 hours.

The binder portion of the concrete is a curable resin, preferably an epoxy resin, or a mixture of the curable resin and cement. The cements employed are those normally used in preparing concrete and thus, for example, either Portland cement or aluminous cement or a mixture thereof can be used. The particular cement will be chosen on the basis of the particular end use application contemplated and it is, of course, preferred to use a cement which has a minimum amount of electrically conductive material within it.

The preferred polymer is a hydantoin epoxy resin. Hydantoin is a five-membered heterocyclic ring containing two nitrogens and in forming epoxy resins, the hydantoin is usually di-substituted at the five position with alkyl groups and most often with lower alkyl groups. A great variety of epoxy resins can be formed through the reaction of hydantoin with epichlorohydrin. For example, hydantoin rings can be linked together to form an extended resin analogous in structure to bisphenol A. Polyfunctional resins can also be formed from these chain extended materials by glycidylization of the hydroxyl groups and the remaining nitrogen. The binder will generally be employed in an amount of from about 10 to 20% by weight based on the total weight of binder and aggregate. It will be understood that the binder contains the hydantoin epoxy resin, curing agent, and catalyst. It is preferred to use about 90 to 140, preferably about 105 to 125, parts by weight of hardener per 100 parts of epoxy resin and about 0.1 to 1.5, preferably about 0.25 to 2.75, parts by weight of catalyst per 100 parts of epoxy resin.

The concrete of this invention can be prepared by merely mixing the aggregate and binder together in the conventional manner under vacuum to exclude air entrainment and then heating the formed or shaped mixture in order to initiate curing. The concrete can also be prepared by impregnating a cement-aggregate concrete. In the latter instance, the cement and concrete are mixed in the conventional manner and allowed to partially cure and dry and then the partially cured concrete is impregnated with the resin binder under vacuum conditions.

It will be recognized that the silanes employed in the instant invention are conventionally used as adhesion promoters in mineral filled composites. The silane treatment of the instant invention, however, does not result in any physical improvement, i.e., physical strength, since the strength of the aggregate is the controlling factor. The treatment does decrease moisture absorption under high humidity conditions. It is theorized that the enhanced moisture resistance is the result of the increasing the bonding forces between the binder and aggregate which reduces the molecular transmission of moisture along the grain boundaries, the primary points at which the moisture permeates.

The resistance to moisture absorption is most conveniently determined by measuring the change in dissipation factor since this parameter is the one most changed by moisture and is more sensitive than gravimetric measurements.

In order to further illustrate the present invention, various examples are set forth below. Unles otherwise indicated, all temperatures are in degrees Centigrade and all parts and percentages are by weight throughout this specification and claims.

Two concrete samples were prepared by mixing 756 parts of coarse crushed electrical grade felspathic porcelain (greater than 30 mesh), 376 parts of medium crushed electrical grade felspathic porcelain (less than 30 mesh), 510 parts of silica flour (325 mesh), 148 parts of hydantoin epoxy resin, 174 parts of methyltetrahydrophthalic anhydride, 0.75 part of benzyldimethylamine catalyst and 4 parts of Monsanto Corp. Modiflow flow control additive at about 55° C. and then the mixed material was introduced into a mold. The mold was then vibrated for 2 minutes to densify and express air, followed by heating at 80° C., for 45 minutes in order to gell the resin. Thereafter the concrete bodies are cured at 149° C. for 4 hours.

In one of the samples, the porcelain and silica flour was silane treated as follows. The dry aggregate was placed in an enclosed tumbling device. A mixture of 1 weight percent based on the weight of the aggregate of β-(3,4-epoxycyclohexyl) ethyltrimethoxysilane diluted with an equal amount of a 10% water/90% isopropyl alcohol mixture was introduced into the tumbling device as a thin stream over a period of about 5 minutes. The device was then agitated for an additional 10 minutes after which the aggregate was dried in a layer not greater than 2.54 cm for at least 1 hour at 105° C.

The two concrete samples were aged in a 95% relative humidity atmosphere and the dissipation factor measured. The results are shown in the following table.

| Days at 95% R.H. | Dissipation Factor (% tan δ 23° C) of Untreated Concrete | Treated Concrete |
|---|---|---|
| 0 | 2.2 | 1.9 |
| 5 | 2.9 | 2.4 |
| 15 | 3.95 | 2.8 |
| 24 | 4.35 | 3.0 |
| 40 | 4.6 | 3.47 |
| 50 | — | 3.7 |
| 52 | 5.1 | — |
| 68 | 5.6 | 3.75 |
| 75 | 5.8 | 3.7 |
| 80 | — | 3.6 |

The foregoing concrete preparation was repeated except that alumina porcelain was used and the amount of hydantoin epoxy resin was increased from 148 parts to 150 parts. The dissipation factor of the concrete prepared using the silane treated aggregate was about 1.9 initially, increased to about 2.8 after about 25 days and then remained at about 2.8 for an additional 30 days. The dissipation factor of the concrete prepared with untreated aggregate was initially about 2.2 which increased to about 3.5 after 30 days, to about 3.9 after about 38 days and then remained at about 3.9 for a additional 20 days. The dielectric constant (60HZ, 23° C.) of the concrete prepared with the silane treated aggregate was initially about 5.8 and substantially linearly increased to about 5.9 over 50 days while the concrete prepared with untreated aggregate had an initial dielectric constant of about 6.3 which increased substantially linearly to about 6.7 after 50 days. All measurements were made on samples being aged at 95% relative humidity.

Various changes and modifications can be made in the process and products of this invention without departing from the spirit and scope thereof. The various embodiments set forth herein were for the purpose of further illustrating the invention but were not intended to limit it.

I claim:

1. An electrical insulation grade polymer containing concrete comprising a polymer and a silane treated crushed electrical insulation grade porcelain aggregate.

2. The electrical insulation grade polymer concrete of claim 1 wherein said silane is of the formula R'Si(OR)$_3$ wherein R is alkyl or alkoxyalkyl and R' is alkyl, alkylene, or amino, epoxy or mercapto substituted alkyl.

3. The electrical insulation grade polymer concrete of claim 2 wherein R is lower alkyl and R' is epoxy substituted alkyl.

4. The electrical insulation grade polymer containing concrete of claim 3 wherein said silane is β-(3,4-epoxycyclohexyl) ethyltrimethoxysilane.

5. The electrical insulation grade polymer concrete of claim 1, wherein said polymer is 10 to 20% of the total weight of the polymer and aggregate.

6. A method of preparing an electrical insulation grade polymer concrete which comprises contacting a crushed electrical insulation grade porcelain aggregate with a silane, combining said silane treated aggregate with a resin, and thereafter curing the resulting mixture.

7. The method of claim 6, wherein said silane is employed in an amount of about 0.05–2.0 weight percent based on the weight of said aggregate and wherein said resin is 10–20% of the combined weight of the resin and aggregate.

8. The method of claim 6 wherein said silane is of the formula R'Si(OR)$_3$ wherein R is alkyl or alkoxyalkyl and R' is alkyl, alkylene, or amino, epoxy or mercapto substituted alkyl.

9. The method of claim 8 wherein R is lower alkyl and R' is epoxy substituted alkyl.

10. The method of claim 9 wherein said silane is β-(3,4-epoxycyclohexyl) ethyltrimethoxysilane.

* * * * *